United States Patent
Arbab et al.

(10) Patent No.: US 6,778,192 B2
(45) Date of Patent: Aug. 17, 2004

(54) SYSTEM AND METHOD FOR CREATING MARKERS ON SCROLL BARS OF A GRAPHICAL USER INTERFACE

(75) Inventors: Reza Arbab, Austin, TX (US); Rene R. Martinez, Austin, TX (US); Daniel P. McNichol, Cedar Park, TX (US); Jessica Murillo, Hutto, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 09/826,703

(22) Filed: Apr. 5, 2001

(65) Prior Publication Data

US 2002/0145631 A1 Oct. 10, 2002

(51) Int. Cl.⁷ ................................................. G09G 5/00
(52) U.S. Cl. ....................... 345/786; 345/973; 345/974; 345/833; 345/684; 345/768; 345/787
(58) Field of Search ................................. 345/973, 974, 345/833, 711, 687, 786, 787, 784, 785, 684, 773, 772, 774; 715/539

(56) References Cited

U.S. PATENT DOCUMENTS

| | | | | |
|---|---|---|---|---|
| 5,506,951 A | * | 4/1996 | Ishikawa | 345/786 |
| 5,550,969 A | * | 8/1996 | Torres et al. | 345/787 |
| 5,623,588 A | * | 4/1997 | Gould | 345/787 |
| 5,805,161 A | * | 9/1998 | Tiphane | 345/786 |
| 6,590,595 B1 | * | 7/2003 | Wagner et al. | 345/784 |

* cited by examiner

*Primary Examiner*—John Cabeca
*Assistant Examiner*—Namitha Pillai
(74) *Attorney, Agent, or Firm*—Diana L. Roberts; Edmond A. DeFrank

(57) ABSTRACT

The present invention is embodied in a system and method for creating markers on scroll bars of a graphical user interface. Basically, the present invention allows users to reference locations of interest within a document using scroll bars of a user interface by creating graphical halt and pause points on the scroll bar at the locations of interest. In general, the present invention includes a user interface with a digital document of an application being used by a user. The application has at least a vertical scroll bar for moving from one location to another within the digital document. The scroll bar includes a scroll box, stub points and end points. The stub points represent reference points within the digital document that are predefined by the user. The stub points either stop or pause the movement of the scroll box as it moves along the scroll bar. The end points represent the top and bottom portion of the digital document.

17 Claims, 3 Drawing Sheets

SYSTEM AND METHOD FOR CREATING MARKERS ON SCROLL BARS OF A GRAPHICAL USER INTERFACE

BACKGROUND OF THE INVENTION

1. Field of the Invention

The present invention relates to a system and method for creating markers on scroll bars of a graphical user interface. In particular, the present invention relates to a system and method for referencing locations of interest within a digital document using a scroll bar of a user interface, comprising creating graphical halt and pause points on the scroll bar at the locations of interest.

2. Related Art

Computers are a regular part of the everyday lives of many people. Computers are typically used in one's home as well as one's business or work place. A computer monitor is one of the main interfaces that is used to enable a person to interact with the computer. The computer monitor has a display screen for displaying information, usually in graphical format, to the user. Input devices, such as a mouse and a keyboard, are also devices that are used to interface a user with the computer.

The junction between a user and the computer is commonly called a user interface. A user interface is typically in the form of a set of commands and menus through which a user communicates with the computer. A command-driven interface is one in which a user enter commands. A menu-driven interface is one in which a user selects command choices from various menus displayed on the screen. The user interface is one of the most important parts of a computer system because it determines how easily a user can make the program do what the user wants. Graphical user interfaces (GUIs) that use windows, icons, and pop-up menus have become standard on personal computers.

One common component of the graphical user interface is the scroll bar. The scroll bar typically appears on the side or bottom of a window of the user interface and allows a user slidable viewing control over a digital document within the user interface's viewable frame. The scroll bar is intended to make it easy for the user to graphically move quickly to locations within the document. Also, most scroll bars have arrows at either end, a gray or colored area in the middle, and a scroll box (or elevator) that moves from one end to the other to reflect the position within the document. Clicking on the arrows causes the document to scroll in the indicated direction. In operation, a user can move to any part of a document by dragging the scroll box to the corresponding part of the scroll bar. Many computer systems support both horizontal and vertical scroll bars.

However, although scroll bars allow users to quickly scroll up and down through several pages of a document to view data, they are lacking in practicality in some areas. One example where scroll bars have limited practical use is with a typical digital spreadsheet or database that has hundreds or thousands of row entries. In this example, it is assumed that the very first row holds the "net" data, which typically is a location where the user will want to visit often. Also, there may be points of interest within the spreadsheet that the user would like visit and alter data, then see how that affects the net data on the first row. These other points of interest can be spread out between hundreds or thousands of row entries.

Although the user can easily visit the first row by clicking on the scroll box and sliding it all the way to the top, it can be a difficult task to scroll through hundreds or thousands of row entries to find a certain point of interest. Namely, to get to a point of interest in the body of the spreadsheet, a user must patiently use the arrow keys on the keyboard or click on the scroll box and slide it while looking for the point of interest. This can be a very tedious and time consuming task, especially with documents that have several hundreds of pages or digital spreadsheets with thousands of row entries that have similar data formats in each row entry.

Therefore, what is needed is a system and method for reliably locating certain designated points within a digital document by creating markers on scroll bars of a graphical user interface that relate to user defined points of interest. What is also needed is a system and method for easily referencing locations of interest within a digital document using markers that control the user's movement along the scroll bar by pausing and halting the scroll box as it is moved along the scroll bar.

SUMMARY OF THE INVENTION

To overcome the limitations in the prior art described above, and to overcome other limitations that will become apparent upon reading and understanding the present specification, the present invention is embodied in a system and method for creating markers on scroll bars of a graphical user interface. Basically, the present invention allows users to reference locations of interest within a digital document using typical scroll bars of a user interface by creating graphical halt and pause points on the scroll bar at the locations of interest.

In general, the present invention includes a user interface with a digital document of an application being used by a user. The application has at least a vertical scroll bar for moving from one location to another within the digital document. The scroll bar includes a scroll box, end points and stub points. The end points represent the top and bottom portions of the digital document. The stub points represent reference points within the digital document that are predefined by the user or the application and located directly on the scroll bar. The stub points function to either stop or pause the movement of the scroll box as the user moves it along the scroll bar.

In particular, there are three types of stub points, a firm stub point, a semi-firm stub point and a dissolving stub point. The firm stub point is used as a permanent reference point. The semi-firm stub point is used as a semi-permanent reference point. The dissolving stub point is used as a temporary reference point. The dissolving stub point dissolves or is automatically removed after the scroll bar contacts the dissolving stub point, thus, it is a temporary stub point. All three stub points are predefined either by the user or the application as a point of interest.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Introduction

Figure 1:
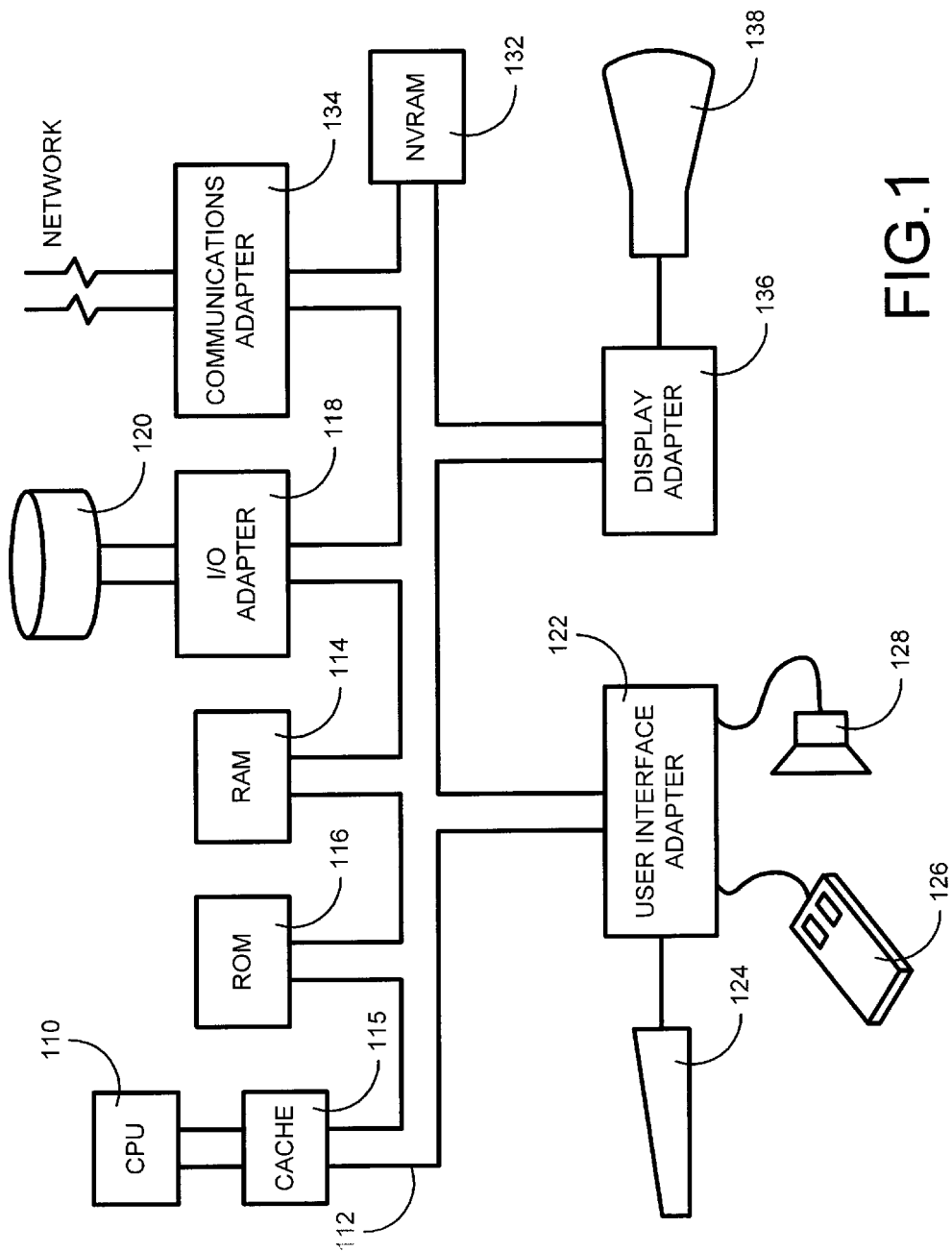
FIG. 1 illustrates a conventional hardware configuration for use with the present invention.

The preferred embodiments may be practiced in any suitable hardware configuration that uses a networked connection, such as computing system 100 illustrated in FIG. 1 or, alternatively, in a laptop or notepad computing system. Computing system 100 includes any suitable central processing unit 110, such as a standard microprocessor, and any number of other objects interconnected via system bus 112. For purposes of illustration, computing system 100 includes memory, such as read only memory (ROM) 116, random access memory (RAM) 114, and peripheral memory devices (e.g., disk or tape drives 120) connected to system bus 112 via I/O adapter 118. Computing system 100 further includes a display adapter 136 for connecting system bus 112 to a conventional display device 138. Also, user interface adapter 122 could connect system bus 112 to other user controls, such as keyboard 124, speaker 128, mouse 126, and a touchpad (not shown).

One skilled in the art readily recognizes how conventional computers and computer programs operate, how conventional input device drivers communicate with an operating system, and how a user conventionally utilizes a input devices to initiate the manipulation of objects in a graphical user interface.

A graphical user interface (GUI) and operating system (OS) of the preferred embodiment reside within a computer-readable media and contain device drivers that allows one or more users to initiate the manipulation of displayed object icons and text on a display device. Any suitable computer-readable media may retain the GUI and operating system, such as ROM 116, RAM 114, disk and/or tape drive 120 (e.g., magnetic diskette, magnetic tape, CD-ROM, optical disk, or other suitable storage media).

In the preferred embodiments, the COSE.TM. (Common Operating System Environment) desktop GUI interfaces the user to the AIX. TM. operating system. The GUI may be viewed as being incorporated and embedded within the operating system. Alternatively, any suitable operating system or desktop environment could be utilized. Examples of other GUIs and/or operating systems include X11.TM. (X Windows) graphical user interface, Sun's Solaris.TM. operating system, and Microsoft's Windows 95.TM. operating system. It should be noted that the GUI and operating system merely instruct and direct CPU 110.

II. General Overview of the Components

Figure 2:
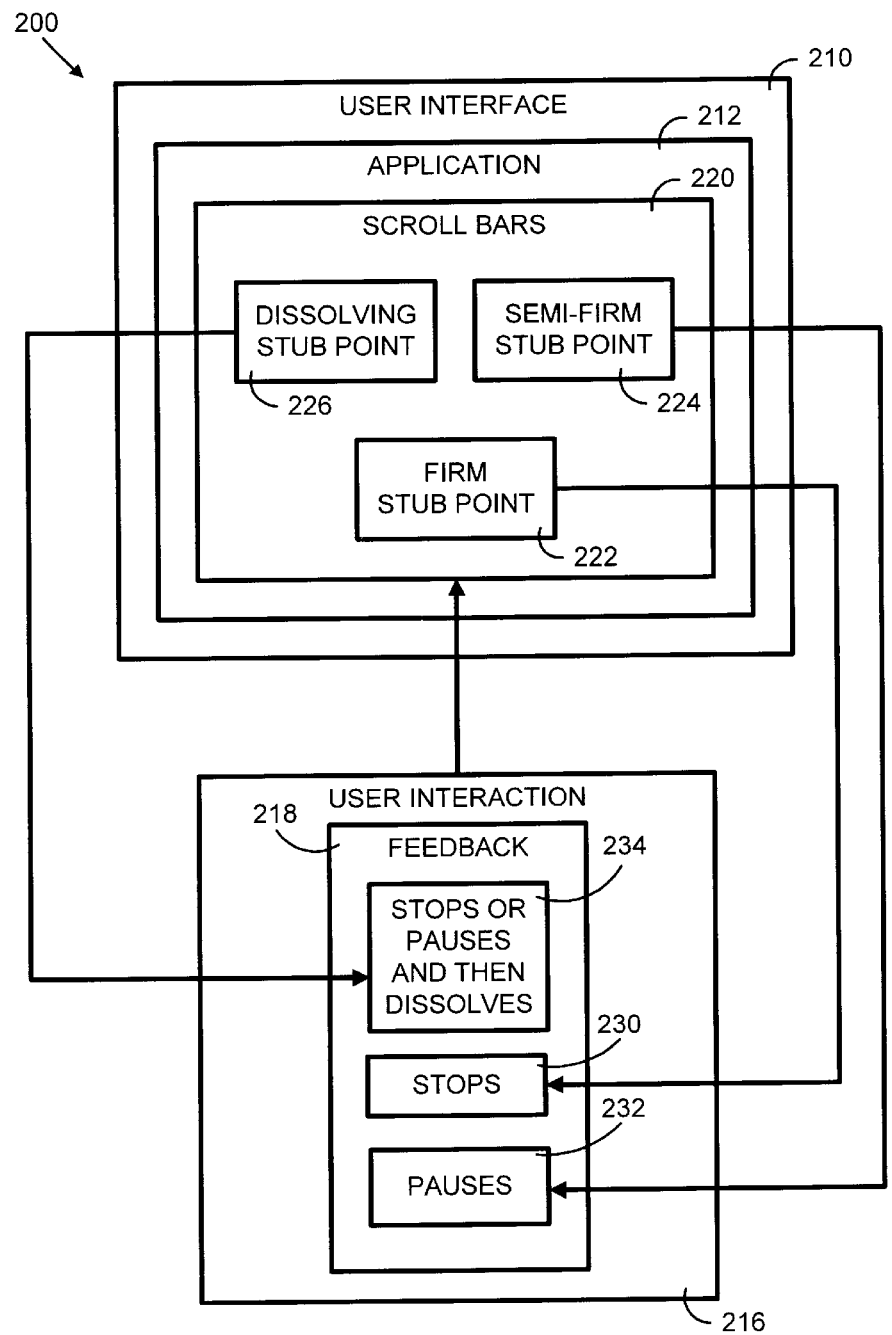
FIG. 2 is a block diagram showing further details of selected components of the present invention.

FIG. 2 is a block diagram showing further details of selected components of the present invention. The system 200 includes a user interface 210 with a digital document of an application 212 being used by a user. User interaction 216 allows immediate feedback 218 to the user. The application 212 has at least one scroll bar 220, preferably a vertical scroll bar, for moving from one location to another within the digital document. The scroll bar 220 includes markers or stub points as reference points.

The stub points are preferably graphical rectangular boxes that are located along the scroll bar and represent reference points within the digital document that are predefined by the user or the application and are located directly on the scroll bar 220. The stub points function to either stop or pause the movement of the scroll box at the predefined points of interest as the user moves the scroll box along the scroll bar 220. There are three types of stub points, a firm stub point 222, a semi-firm stub point 224 and a dissolving stub point 226. All three stub points are predefined either by the user or the application 212 as a particularly important point of interest. They can be created in any suitable manner.

For instance, the application 212 can have a software module that allows the user to create "stub points" at predefined locations within the document from either drop down menus or shortcut functions enabled by the user interface. For example, the software module can be preprogrammed to allow a user to create the stub points at any location in the digital document. The software module can be integrated with the menus and interfaces of the application to seamlessly allow the user to create stub points at a particular point of interest. Each created stub point is directly associated with a specific location on the scroll bar. Hence, as the user moves along the scroll bar, the scroll box will contact and either stop or pause at the particular point of interest created by the particular stub point.

Also, the application 212 can create, on its own as a programmable intelligent decision, each of the stub points if a point in the document is determined by the application to be a point of interest based on a prior knowledge base or based on gathered information from the user and the user's tendencies. For example, a priori knowledge base would be a knowledge base of typical words or indicia that represents points of interest in a document, such as the term "total" in a spreadsheet, which would represent a cell that normally would be a point of interest. An example of gathered information from the user and the user's tendencies would be to mark cells of a spreadsheet that is often changed or modified by the user or cells that are dynamic, such as cells that contain formulas. The application 212 can infer the points of interest and their importance based on user interaction with the application 212.

In general, the firm stub point 222 is used as a permanent reference point, the semi-firm stub point 224 is used as a semi-permanent reference point and the dissolving stub point 224 is used as a temporary reference point and can either stop or pause movement along the scroll bar 220.

III. Details of the Operation

Figure 3:
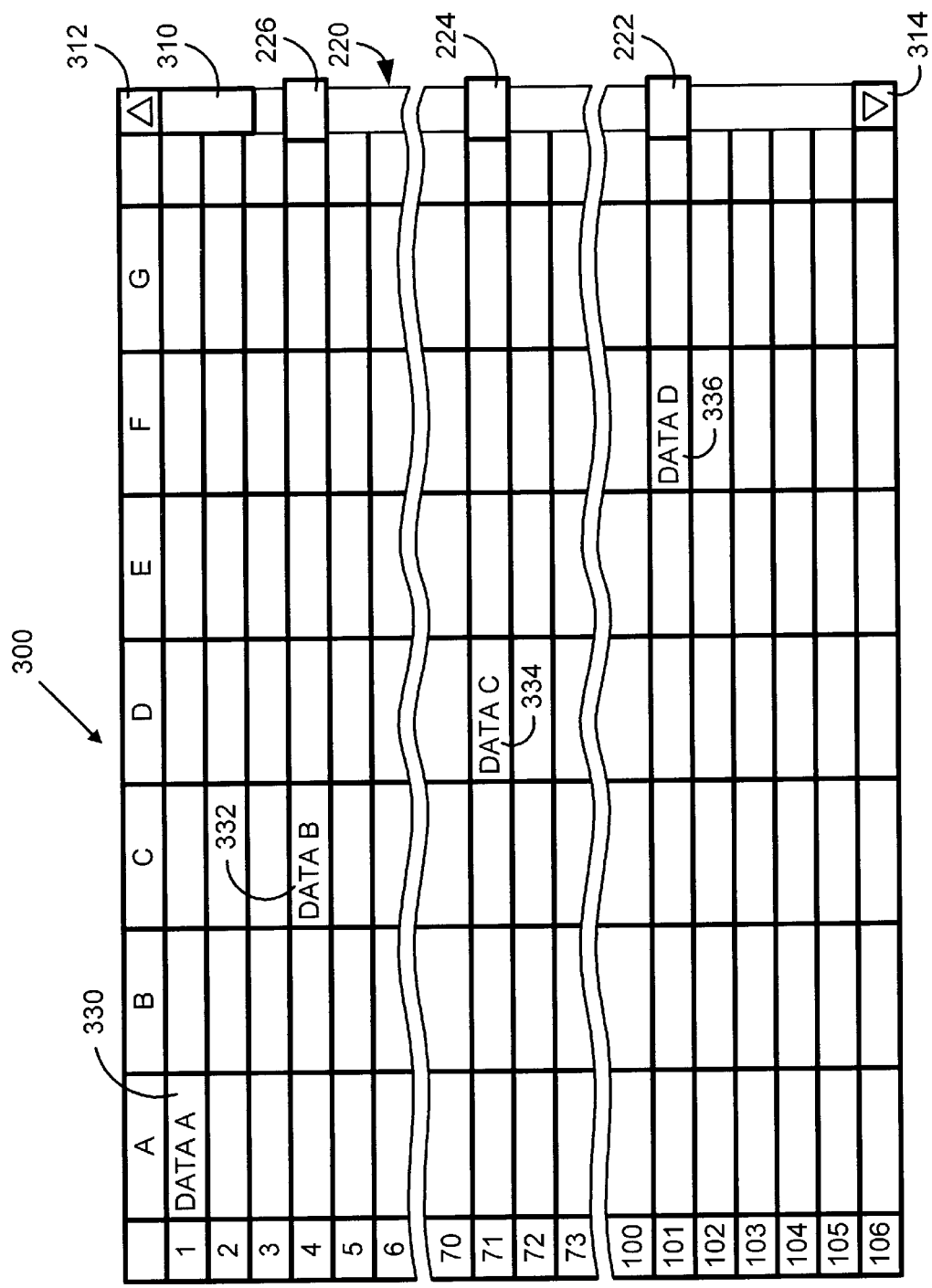
FIG. 3 is a sample user interface illustrating a working example of the present invention operating in a computer environment.

FIG. 3 is a sample user interface illustrating a working example of the present invention operating in a computer environment. Referring to FIG. 3 along with FIG. 2, the user interface 300 includes the scroll bar 220 a scroll box 310, end points 312, 314 and stub points 222, 224, 226. The end points 312, 314 represent the top and bottom portions of the digital document. Arrows located at each end point 312, 314 allow the user to move within the document in the direction of the arrow when the arrow is depressed by the user.

Referring to FIG. 3 along with FIG. 2, the firm stub point 222 is used as a permanent reference point. In other words, the feedback 218 provided to the user includes stopping movement 230 along the scroll bar 220 at the predefined permanent reference point marked by the firm stub point 222. This stub point is used for the most important points of interest. Assuming a user starts at the beginning of a document, if the user wishes to continue sliding down the scroll bar, they must let go of the scroll box 310 for a moment, move the mouse pointer to any scroll bar location past the firm stub point 222 and click on the scroll bar 220. When the user reaches the stub point 222 and releases the scroll box 310, the user will be automatically located below the stub point 222. In other words, the scroll box 310 will jump past the firm stub point 222 and be once again controlled by the mouse pointer on the scroll bar 220.

In particular, movement along the scroll bar 220 is halted when the scroll box 310 makes contact with the firm stub point 222. Consequently, the user is not allowed to move past the firm stub point 222 without releasing hold of the scroll box 310. Therefore, the user must stop at that reference point within the digital document. It should be noted that although the description above refers to the user scrolling down, the user can reach the stub point from either an up or down direction.

The semi-firm stub point 224 is used as a semi-permanent reference point and movement along the scroll bar 220 is paused 232 for a specific time at the predetermined reference point marked by the semi-firm stub point 224. If the user continues to "pull down" on the scroll box 310, the scroll box 310 will push its way past the semi-firm stub point 224 and continue its slide down the scroll bar 220. However, after pushing through the semi-firm stub point 224 with the scroll box 310, the semi-firm point 224 still exists on the scroll bar 220. Basically, when the scroll box 310 makes contact with the semi-firm stub point 224, scrolling is momentarily paused at the particular reference point. After the short pause, the user is allowed to move past the semi-firm stub point 224. Thus, the user can scroll past the semi-firm stub point 224 without releasing hold of the scroll box 310.

The dissolving stub point 224 is used as a temporary reference point and can either stop or pause movement along the scroll bar 220. The stub point 224 dissolves or is automatically removed 234 after the scroll bar 220 contacts the dissolving stub point 224 and movement is either slowed, paused or stopped. Particularly, movement along the scroll bar 310 is either paused or halted when the scroll box 310 makes contact with the dissolving stub point 226.

In one embodiment, the user is not allowed to move past the dissolving stub point 226 without releasing hold of the scroll box 310, similar to the firm stub point 222. Alternatively, when the scroll box 310 makes contact with the dissolving stub point 226, scrolling is momentarily paused at the particular reference point, similar to the semi-firm stub point 224. After the short pause, the user is allowed to move past the dissolving stub point 226. In both cases, the dissolving stub point 226 dissolves or is automatically removed after the scroll bar 310 contacts the dissolving stub point 226. Thus, it is convenient to place a temporary point of interest with the dissolving stub point 226.

In addition, for all stub points, when a user clicks on the scroll bar 220 past the scroll box 310, but between the scroll box and the stub point, the document is scrolled to the next viewable screen, either in an up or down direction, depending on if the user clicks above or below the scroll box 310. If the user clicks on the scroll bar 220 past both the scroll box 310 and the stub point (either above or below both the scroll box and the stub point), the user is taken directly to the point of interest represented by the particular stub point. Thus, the user can reach the stub point from either an up or down direction, as long as the user clicks on the scroll bar 220 past the scroll box 310 and the stub point from either direction.

Further, when a user clicks on the arrows 312, 314, the document is scrolled until a stub point is reached, either in an up or down direction, depending on if the user clicks on the up arrow 312 or the down arrow 314. Once the user reaches a particular stub point, and the point of interest represented by the particular stub point, movement is stopped or paused or the stub point is possibly dissolved, depending on the type of stub point, in accordance with the description of the stub points above.

IV. Working Example

As one working example, it is assumed that there is a first entry point, data point A 330 and three points of interest, data point B 332, data point C 334, and data point D 336 in the body of an example spreadsheet 300. At data point B 332, a dissolving stub point 226 is created. After viewing net data at the first row, namely data point A 330, the user selects the scroll box 310 and slides it towards dissolving stub point 226. The scroll box 310 stops (or pauses) at data point B 332 as the scroll bar 310 contacts that point. After the scroll box 310 either stops or pauses when the user contacts the dissolving stub point 226 with the scroll box 310, the stub point 226 for data point B 332 dissolves and no longer exists.

When the user scrolls to data point C 334, the scroll box 310 stops momentarily at data point C 334 as the scroll bar 310 contacts the semi-firm stub point 224. Basically, scrolling action is paused for about half a second and then continues to give the user the chance to actually stop at the point of interest one the point of interest is flagged. This pause allows the user to continue to scroll after being alerted of the referenced point of interest. Specifically, the pause and then continue action is based on the system sensing that the user is still "pulling down" the scroll box 310 and desires the scroll box 310 to go past the semi-stub point 224 that was predefined.

Next, data point C 336 can be referenced by firm stub point 222, which requires the user to stop at the point of interest. With a firm stub point 222, the system requires the user to release the scroll box 310 in order to get past the firm stub point 222. This firm stub point 222 is used for the most important points of interest because it ensures that the user will stop at that point.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for scrolling using a scroll bar of an electronic file having end points, comprising:

defining at least one graphical marker on the scroll bar other than one of the end points; and allowing a user to scroll to the at least one graphical marker;

wherein at least one of the graphical markers comprises a dissolving stub point marker located on a portion of the scroll bar for referencing a particular location in the file that is configured to automatically dissolve after the user reaches the particular location in the file referenced by the dissolving stub point marker.

2. The method of claim 1, further comprising relocating the user to at least one of the graphical markers if a portion past the graphical marker of the scroll bar is selected.

3. The method of claim 1, further comprising halting movement along the scroll bar when scrolling along the scroll bar contacts a firm stub point graphical marker.

4. The method of claim 2, further comprising automatically locating the user past the firm stub point when the user reaches the firm stub point graphical marker.

5. The method of claim 1, further comprising pausing movement along the scroll bar when scrolling along the scroll bar contacts a semi-firm stub point marker.

6. The method of claim 1, further comprising halting movement along the scroll bar when scrolling along the scroll bar contacts the dissolving stub point marker.

7. The method of claim 1, further comprising pausing movement along the scroll bar when scrolling along the scroll bar contacts the dissolving stub point marker.

8. The method of claim 1, wherein the markers are predefined at a point of interest by at least one of a user or predefined by an application associated with a document.

9. A scrolling system for scrolling on a scroll bar of an electronic file having end points, the scrolling system allowing a user to scroll through the file and comprising:
   a user interface incorporating the scroll bar and a scroll box traversable within the scroll bar; and
   at least one graphical marker located on the scroll bar other than one of the end points;
   wherein at least one of the graphical markers comprises a dissolving stub point marker located on a portion of the scroll bar for referencing a particular location in the file that is configured to automatically dissolve after the user reaches the particular location in the file referenced by the dissolving stub point marker.

10. The scrolling system of claim 9, further comprising a firm stub point marker that halts movement along the scroll bar when the scroll box moves along the scroll bar and contacts the firm stub point marker.

11. The scrolling system of claim 9, further comprising a semi-firm stub point marker that pauses movement along the scroll bar when the scroll box moves along the scroll bar and contacts the semi-firm stub point marker.

12. The scrolling system of claim 9, wherein movement along the scroll bar with the scroll box is halted when scrolling along the scroll bar contacts the dissolving stub point marker.

13. The scrolling system of claim 9, wherein movement along the scroll bar with the scroll box is paused when scrolling along the scroll bar contacts the dissolving stub point marker.

14. A computer-readable medium having computer-executable instructions for performing a process on a computer having a user interface with a scroll bar of an electronic file having end points, the process comprising:
   creating at least one graphical marker on the scroll bar other than one of the end points; and
   allowing a user to scroll to the graphical marker;
   wherein at least one of the graphical markers comprises a dissolving stub point marker located on a portion of the scroll bar for referencing a particular location in the file that is configured to automatically dissolve after the user reaches the particular location in the file referenced by the dissolving stub point marker.

15. The process of claim 14, further comprising halting movement along the scroll bar when scrolling along the scroll bar contacts a firm stub point marker.

16. The method of claim 14, further comprising pausing movement along the scroll bar when scrolling along the scroll bar contacts a semi-firm stub point marker.

17. The method of claim 14, further comprising at least one of halting movement along the scroll bar when scrolling along the scroll bar contacts the dissolving stub point marker or pausing movement along the scroll bar when scrolling along the scroll bar contacts the dissolving stub point marker.

* * * * *